Dec. 26, 1922.

J. D. SPRECKELS, Jr., ET AL.
SUGAR PACKING AND BOXING MACHINE.
FILED MAY 5, 1919.

INVENTORS
JOHN D. SPRECKELS, JR
RICHARD LABORDA

BY
Strong & Townsend.
ATTORNEYS

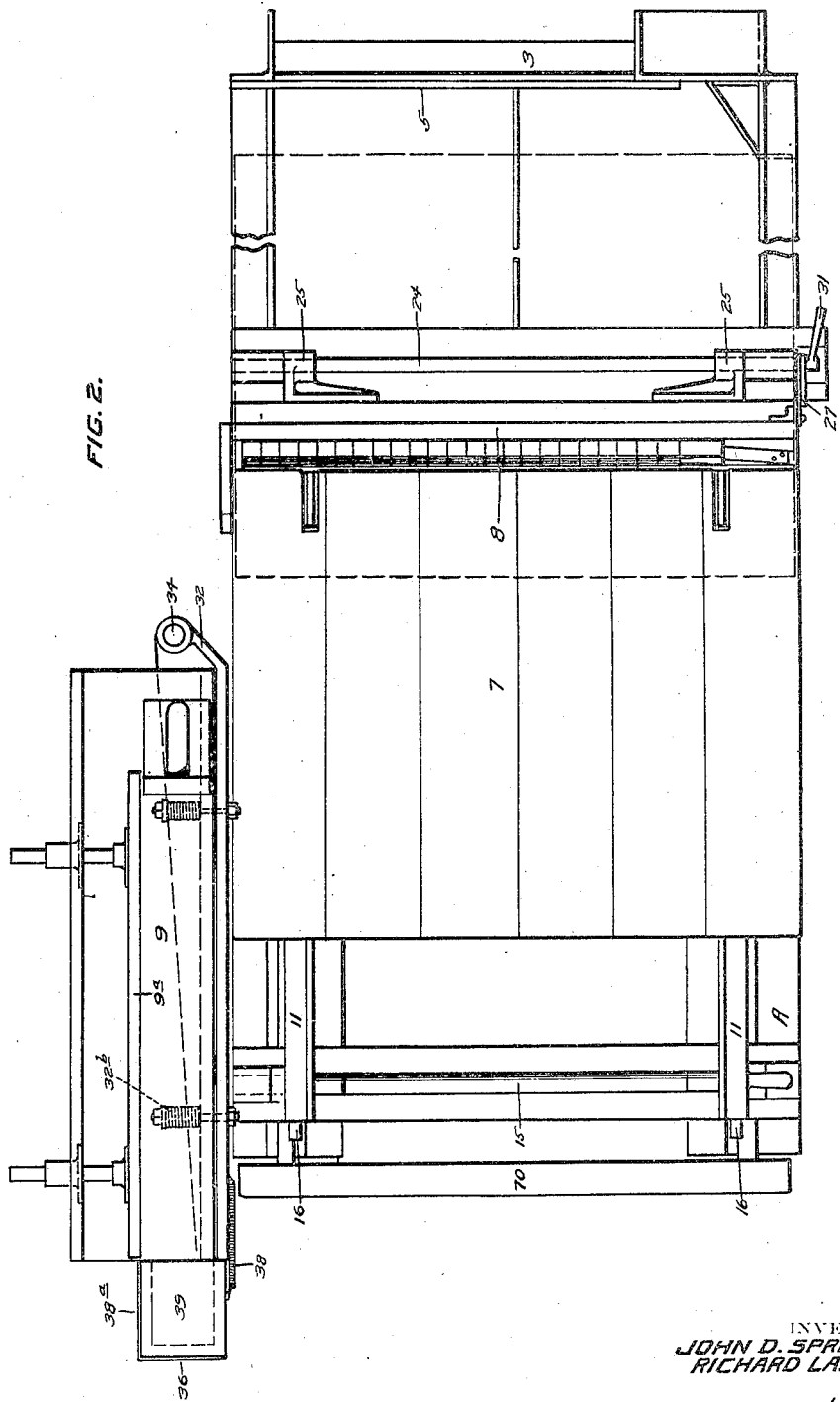

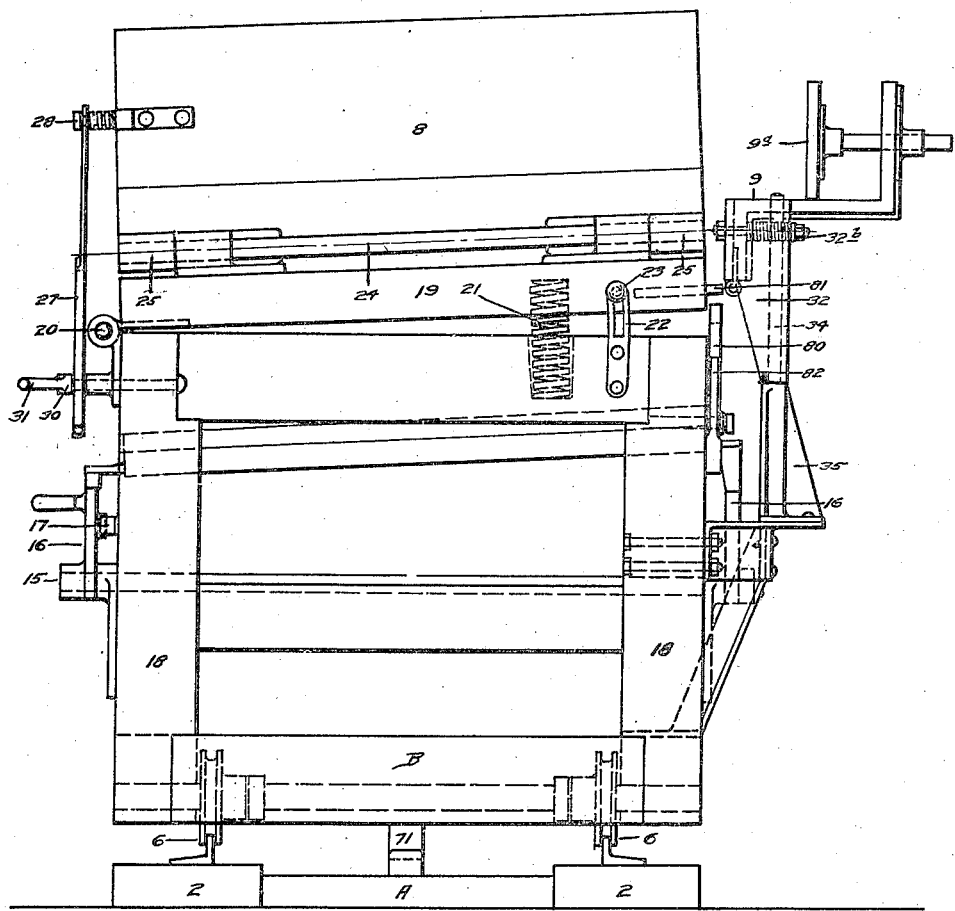

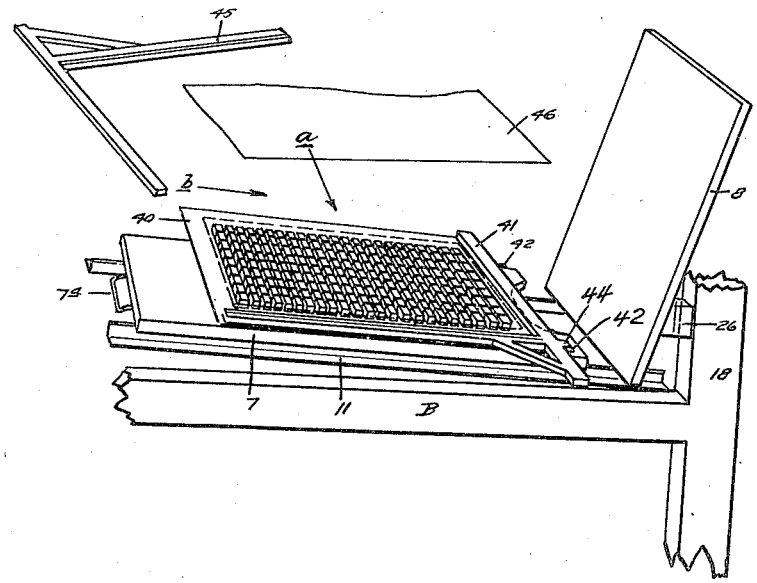
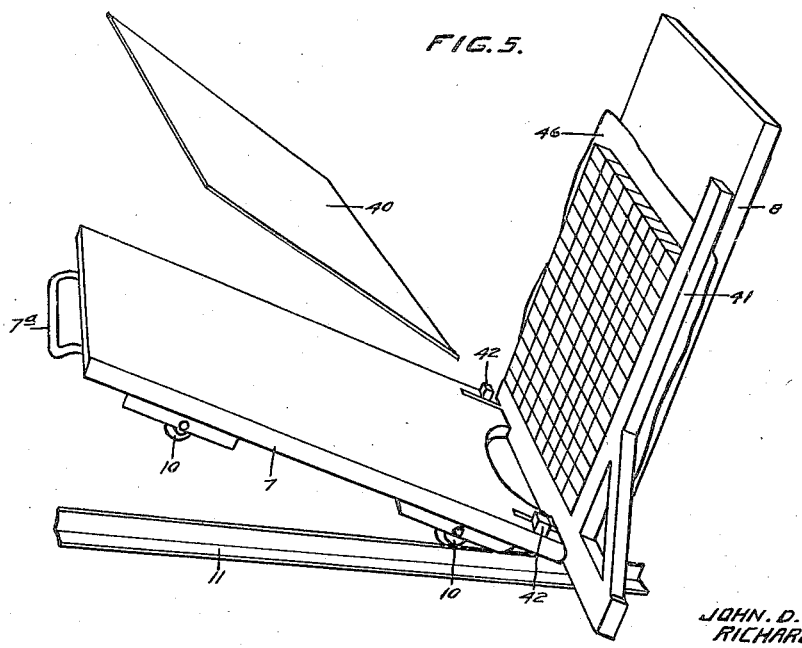

Dec. 26, 1922.
J. D. SPRECKELS, Jr., ET AL.
SUGAR PACKING AND BOXING MACHINE.
FILED MAY 5, 1919.
1,439,983.
7 SHEETS—SHEET 5.
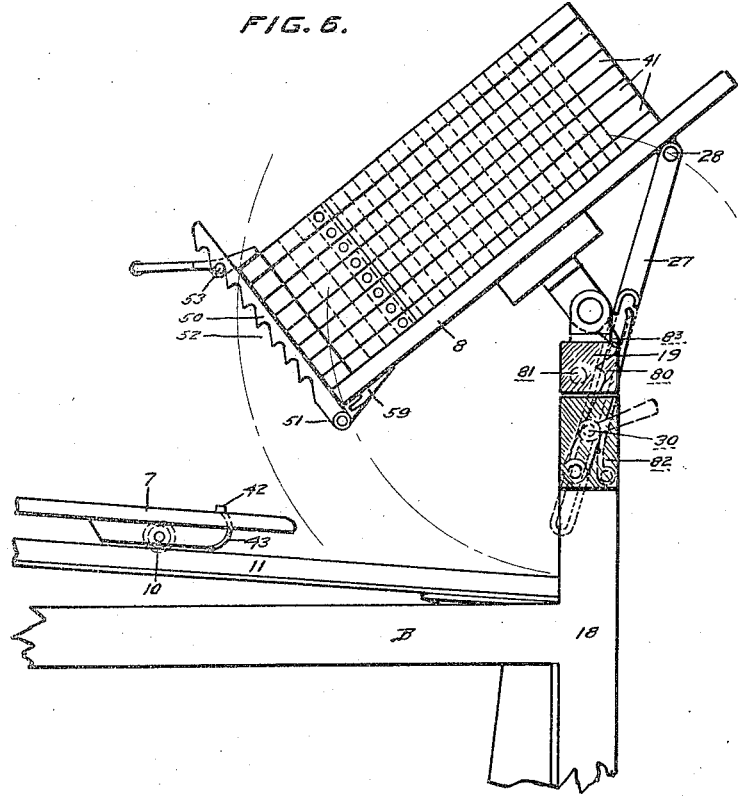
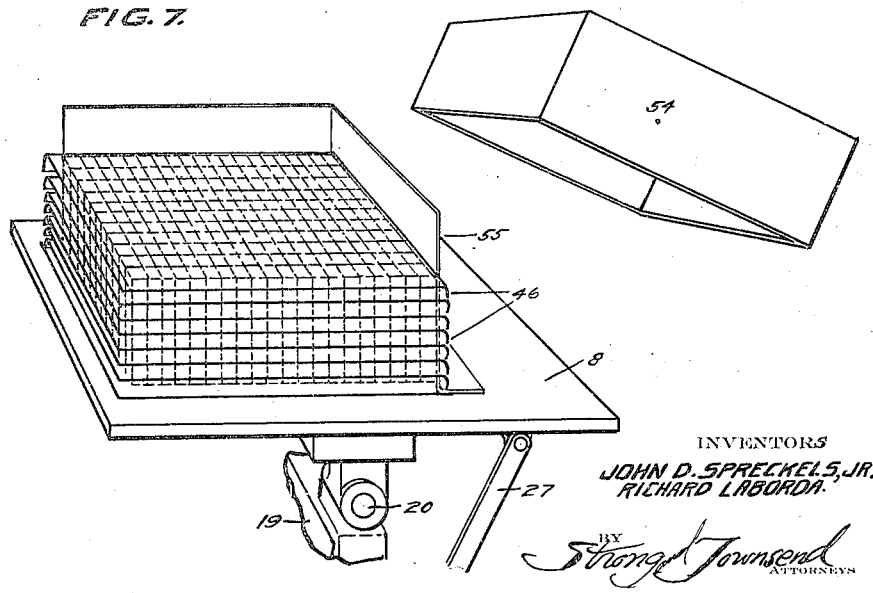
INVENTORS
JOHN D. SPRECKELS, JR.
RICHARD LABORDA.
BY
Strong Townsend
ATTORNEYS

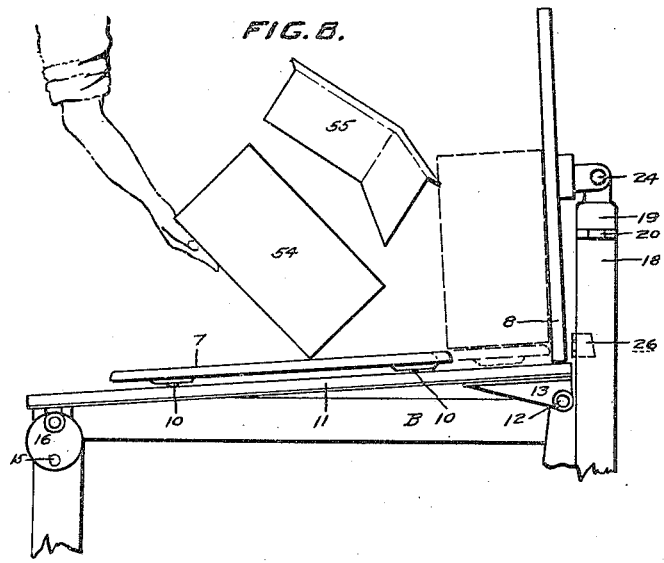
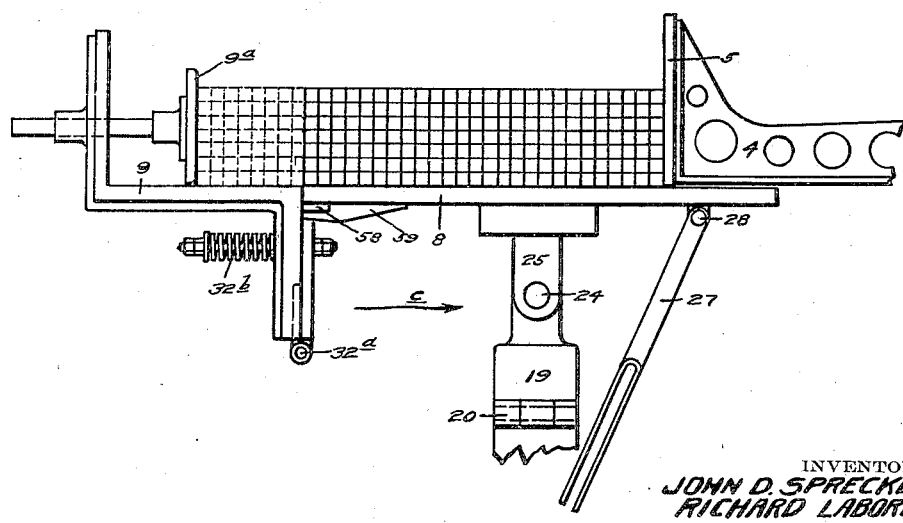

Dec. 26, 1922.
J. D. SPRECKELS, Jr., ET AL.
SUGAR PACKING AND BOXING MACHINE.
FILED MAY 5, 1919.
1,439,983.
7 SHEETS—SHEET 7.
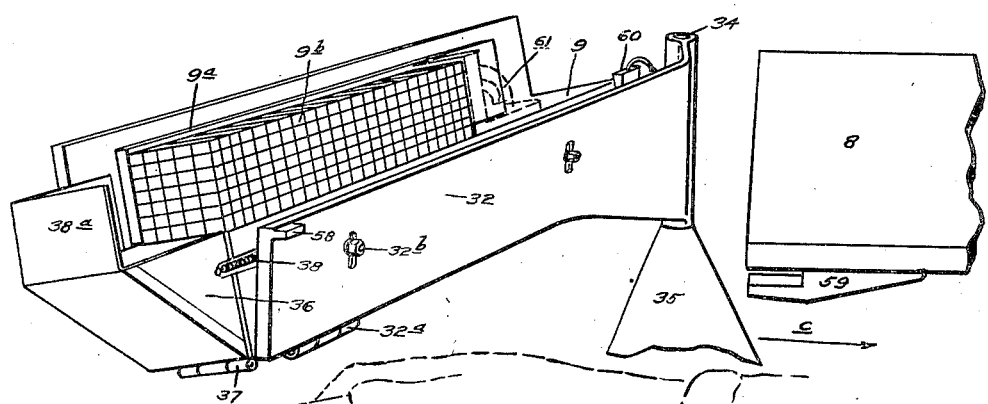
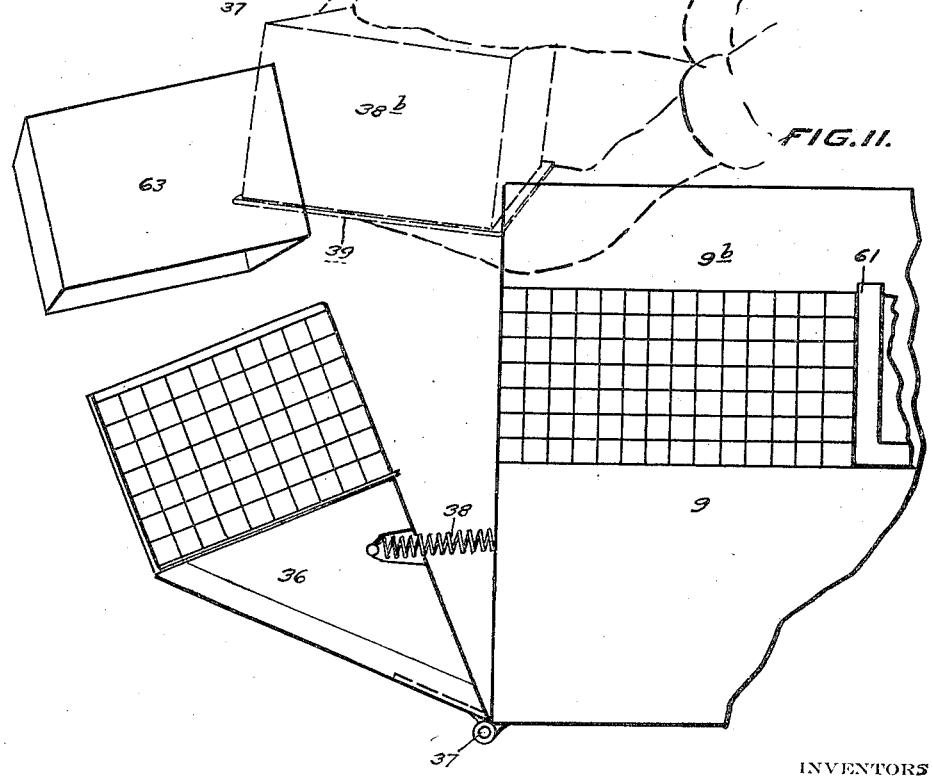
INVENTORS
JOHN D. SPRECKELS, JR.
RICHARD LABORDA
BY
Strong & Townsend
ATTORNEYS Patented Dec. 26, 1922.

1,439,983

UNITED STATES PATENT OFFICE.

JOHN D. SPRECKELS, JR., AND RICHARD LABORDA, OF SAN FRANCISCO, CALIFORNIA; JOHN D. SPRECKELS, SR., AND WALTER D. K. GIBSON, EXECUTORS OF SAID JOHN D. SPRECKELS, JR., DECEASED.

SUGAR PACKING AND BOXING MACHINE.

Application filed May 5, 1919. Serial No. 294,806.

*To all whom it may concern:*

Be it known that we, JOHN D. SPRECKELS, Jr., a citizen of the United States, and RICHARD LABORDA, a subject of the King of Spain, residing at the city and county of San Francisco and State of California, have invented new and useful Improvements in Sugar Packing and Boxing Machines, of which the following is a specification.

This invention relates to a sugar packing and boxing machine and particularly to improvements on the structure shown in our co-pending application entitled "Sugar packing and boxing machine", filed June 24, 1918, Serial No. 241,491.

One of the objects of the present invention is to provide a simple, substantial and easily operated sugar packing and boxing machine, particularly adapted for handling cube sugar and so designed as to be quick and positive in operation and capable of packing boxes or cartons of varying sizes.

Another object of the invention is to provide a machine which is first of all adapted to receive the drying trays supporting the cube sugar; secondly, a machine provided with means for assembling the cubes on the trays; thirdly, transferring the assembled cubes on the trays to a receiving platform and in such a manner that the cubes may be inspected to permit removal of broken or soiled cubes; and fourth, a machine which permits several layers of assembled cubes to be stacked upon the receiving platform.

Another object of the invention is to provide means for transferring the entire assembled stack to a single box when packing and also to provide means for dividing the stack into segregated lots if it is desired to transfer the sugar to cartons or containers of varying sizes.

Further objects will hereinafter appear.

The invention consists of the parts and the construction, combination and arrangement of parts as hereinafter more fully described and claimed, having reference to the accompanying drawings, in which—

Fig. 1 is a side elevation of the machine.
Fig. 2 is a plan view of the same.
Fig. 3 is an end elevation.
Fig. 4 is a perspective detail view, showing the receiving table and a drying tray placed thereon, preparatory to the first step in packing and boxing.

Fig. 5 is a similar view, showing the cubes assembled and transferred to the receiving platform, or the position assumed by the sugar in the second step of the packing and boxing operation.

Fig. 6 is a detail side elevation showing several assembled layers of cubes stacked upon the receiving platform and the position of said platform while being swung from a receiving to a transferring position.

Fig. 7 is a detail perspective view showing the several layers of the several cubes stacked upon the receiving platform in readiness for transfer to the box.

Fig. 8 is a view similar to Fig. 7, showing the transferring operation.

Fig. 9 is a detail side elevation showing the method of dividing the main stack of sugar deposited upon the receiving platform and transferring the same to the secondary receiving platform.

Fig. 10 is a detail perspective view showing the position of the secondary receiving platform and the manner in which the sugar received is divided before it is transferred to the cartons.

Fig. 11 is a detail side elevation of the secondary receiving platform, showing the method of transferring the sugar to the cartons.

Figure 1:
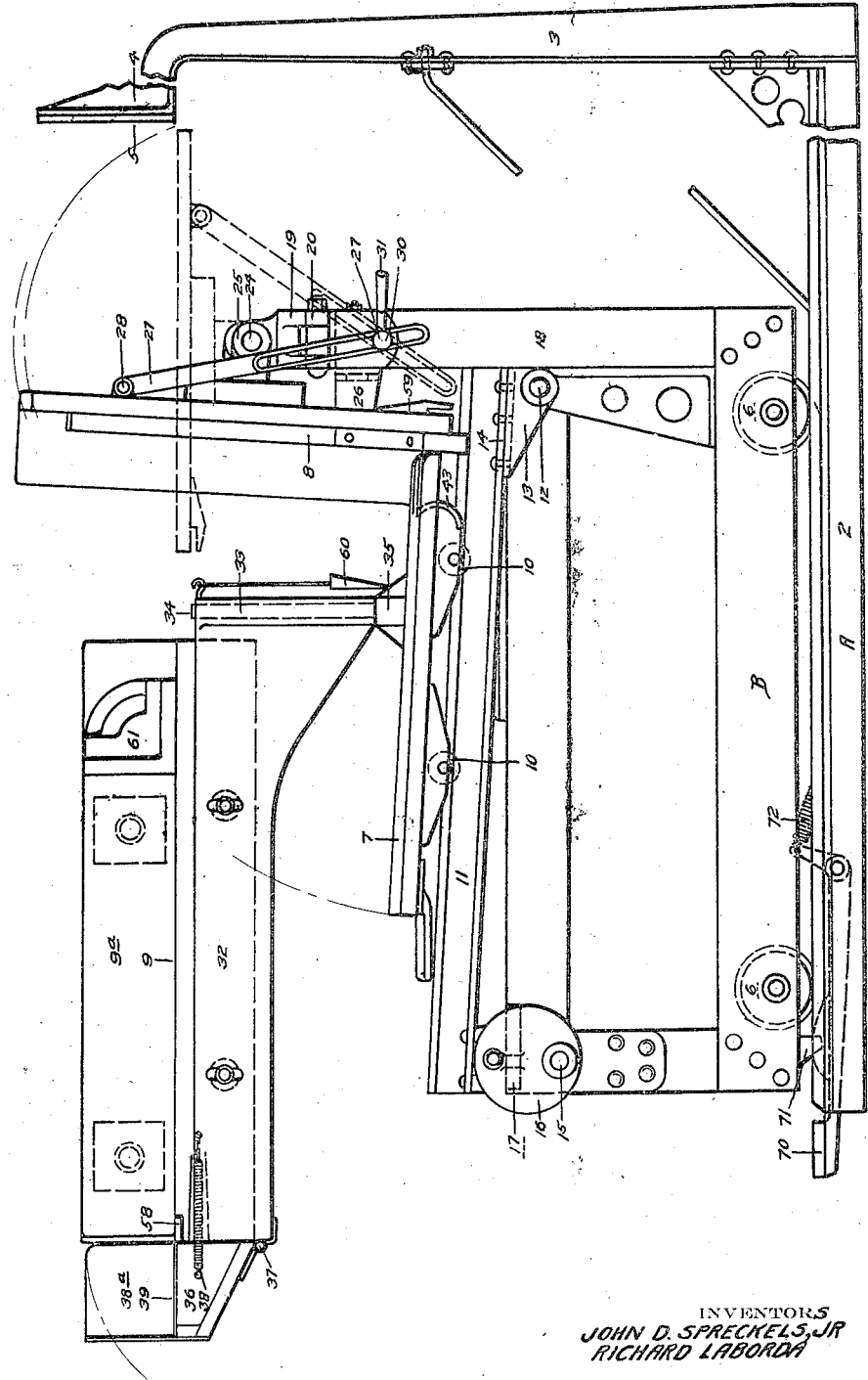

Referring to the drawings in detail, A indicates a base frame upon which is secured a pair of track members 2. Secured at the rear end of the base frame is a vertical end frame 3 and formed integral with the upper end of said frame is a pair of horizontal arms 4, in the forward ends of which is secured a pusher plate 5. Mounted on wheels 6 and movable to and away from the end frame 3, upon the track members 2, is a main frame B upon which is supported a receiving table 7, a receiving platform 8, and a secondary receiving platform 9. The receiving table 7 is supported upon wheels 10 to permit it to be moved to and away from the receiving platform when this assumes the vertical position shown in Fig. 1. The wheels 10 are guided by a pair of angle bars 11 which are supported at one end by means of a shaft 12 and bracket members 13, said bracket members being journaled on the shaft and secured to the angle bars 11, as shown at 14, thus permitting a pivotal movement of the angle bars, as will hereinafter be described.

Extending through the opposite end of the main frame is a shaft 15, upon which is secured a pair of eccentric members 16. These members engage the underside of the angle bars 11 and are provided for the purpose of raising or lowering the forward ends of the same, the shaft 15 and the eccentrics secured thereto being normally secured in a raised position shown in Fig. 1, by means of a latch member 17. The angle bars 11 serve the function of a pair of track members, the function of which will hereinafter be described. Rigidly secured to the rear end of the main frame B is a pair of vertically disposed posts 18 on which is supported a cross-bar 19. This bar is secured to one of the posts by means of a hinge 20 and is normally held in a raised position with the opposite post by means of a coil spring 21, the upward movement or angular position secured by the cross bar 19 being regulated by means of a slotted plate 22 and a pin 23 extending therethrough. Journaled on the upper side of the cross bar 19 is a shaft 24 and secured to said shaft by means of a pair of bracket plates 25 is the receiving platform 8. This platform is adapted to be swung about the shaft 24 to assume the vertical position shown in Fig. 8 or the horizontal position shown by dotted lines in Fig. 1. The receiving platform is adapted to assume two vertical positions; that shown in Fig. 1 and that shown in Fig. 8.

The normal vertical position of the receiving platform is regulated by a pair of stop members 26. These stop members are hingedly secured, one to each post 18. They are swung out to assume the position shown in Fig. 1 when it is desired to transfer sugar from the receiving table to the receiving platform and they are swung inwardly against the respective posts 18 to permit the receiving platform to assume the position shown in Fig. 8 when it is desired to transfer the sugar to a packing box. It is necessary to rigidly secure the receiving platform when a desired quantity of sugar has been transferred thereto, particularly when it assumes the horizontal position shown by dotted lines in Fig. 1. This is accomplished by providing a slotted link 27. This link is pivotally secured to the lower side of the receiving platform, as shown at 28. The opposite slotted end of the link straddles a pin 29 secured on one of the posts 18 and as this pin is threaded on its outer end and provided with a locking nut 30, it will readily be seen that by providing a handle 31 it will be possible to turn the nut and clamp the link or lock the same against movement, thus rigidly securing the receiving platform when moved or swung into the horizontal position.

The secondary receiving platform shown at 9 is secured to a horizontally disposed bracket arm 32, which is pivotally mounted, as at 33, on a vertically disposed shaft 34. This shaft is secured on one side of the frame by means of a bearing bracket 35 and it forms a pivotal support which permits the arm 32 and the secondary receiving platform supported thereby, to be swung into alignment or register with the main receiving platform 8 or to one side of the machine, as shown in Figs. 1 and 3.

The secondary receiving platform is provided with a transferring platform 36, which is hingedly secured to the bracket arm 32, as shown at 37. The transferring platform is normally held in horizontal position by means of a coil spring 38 but it may be depressed or swung about the hinge 37 to assume an angular position such as shown in Fig. 11, if it is desired to transfer the sugar to cartons of varying sizes. The transferring platform is provided with an angle plate 38$^a$ which is rigidly secured thereto; this angle plate serving as a guide for the carton when this is applied. The platform is also provided with a removable bottom portion 39, which permits the carton and the sugar which it encloses, to be lifted directly from the transferring platform when this assumes the position shown in Fig. 11.

The operation of the packing and boxing machine here shown is substantially as follows: The sugar to be assembled and packed is received upon drying trays 40. These trays are placed directly upon the receiving table 7, see Figs. 1 and 4, and the first operation required is that of assembling the cubes as these are widely separated upon the tray when first received. This is accomplished by first placing a right-angular shaped rack such as shown at 41, upon the tray. This rack embraces the rear end and one side of the tray and it serves the function of a temporary support for the sugar when it is transferred to the receiving platform 8. It is necessary that each layer of sugar transferred to the platform 8 should assume a perfect register and it is also necessary that the cubes be assembled, as shown in Fig. 5, before the transferring operation takes place.

This is accomplished in the following manner: Formed on the rear end of the receiving table 7 is a pair of lugs 42. Also formed on the rear end of the table but on the lower surface thereof, is a pair of rubber shoes 43. Formed on the rear end of the rack 41 is a lug 44, which is adapted to engage one of the lugs 42 and thereby insure a perfect positioning of the rack 41 when it is placed on the tray. A second rack such as shown at 45 is then employed. This rack is placed on the tray; it is first moved in the direction of arrow $a$ and secondly, in the direction of arrow $b$. Movement of the rack in the direction of arrow $a$ will cause the cubes to move together and up against the side portion of the rack 41 while movement of the rack 45 in the direction of arrow $b$ will force the cubes together and against the end portion of the rack. The cubes are in this manner assembled; they are therefore ready for transfer to the receiving platform 8. This is accomplished by first placing a sheet of paper such as shown at 46, on top of the assembled layer of cubes. The receiving table 7 is then grasped by means of a handle $7^a$ and tilted upwardly against the receiving platform 8. The table 7 might have a tendency to roll rearwardly during the raising of the table if it was only supported by the wheels shown at 10. This will, however, not take place in the present instance as the rubber shoes 43 will engage the angle bars or track members 11, thus serving as a pivot or rocker about which the table may be swung without danger of rearward movement during the transferring operation.

The position of the receiving platform 8 is slightly angular with relation to a vertical line and it is therefore necessary to raise the table 7 beyond a vertical position to permit the rack 41 and the assembled layer of cubes supported thereby to be transferred from the table 7 to the receiving platform. Swinging of the table 7 beyond a vertical position permits the rack 41 to slip off the lugs 42, thereby permitting a complete transfer, both of the rack and the sugar carried thereby and simultaneously freeing the table so that it may be moved rearwardly on the track members 11 to receive another tray. This operation constitutes the first stage of the assembling and packing operation.

The second stage of the packing operation consists in stacking one layer after another upon the receiving platform. Each operation of transferring a layer of assembled cubes to the platform 8 is identical to that just described, the only difference being that the table 7 is gradually moved rearwardly as the height or depth of the stack increases. By referring to Fig. 5 it will be seen that the rack member shown at 45 is not transferred to the receiving platform but only the rack shown at 41. Only one rack member such as shown at 45 is therefore required, as this merely serves the function of assembling the cubes upon the trays before the transferring operation.

By referring to Figs. 4 and 5 it will be seen that the angle bars of rails 11 assume a right-angular position with relation to the inclined receiving platform 8; that is, during the operation of transferring the sugar from the drying trays to the receiving platform. This is of importance as it permits the rails 11 to serve as a support for the racks 41 and the layers of sugar supported thereby. After a desired number of layers have been transferred as described, it is necessary to swing the platform 8 into the horizontal position shown by dotted lines in Figs. 1 and 7 and to lock the platform against movement when this position is assumed. It is also necessary to lock the racks 41 while the platform is being swung from the vertical to the horizontal position as the whole stack of assembled sugar and racks supporting the same would slide off the platform the moment it was moved away from the rails 11. A locking bar 50 has therefore been provided. This bar is hingedly secured, as at 51, to the lower side of the receiving platform. It is provided with teeth 52 on one side and with a locking latch 53 which is vertically adjustable on the locking bar 50 to permit it to securely engage the rack members 41. That is, the spacing of the teeth 52 is equal to the thickness of the racks and it is therefore only necessary to move the locking latch 53 until it engages the outermost rack and then to swing it into locking position such as shown in Fig. 6. The racks are thus securely locked to the platform and it is therefore only necessary to swing the same from the vertical receiving position to the horizontal position shown in Figs. 1 and 7.

By referring to Figs. 4, 5, 6 and 7 it can be seen that a sheet of paper has been placed between each layer of assembled cubes and that two ends of said sheet project beyond the cubes, this being particularly shown in Fig. 7. In other words, a sheet of paper, when placed over a new layer of cubes, will pass between the racks 41 and it is therefore necessary to recess the upper surface of each rack a sufficient amount to compensate for the thickness of the paper, thus permitting a perfect stacking and positive support for each rack member when stacked.

From the foregoing description it can be seen that the sugar received has been assembled and then transferred in layers to the receiving platform; also, that several layers have been stacked, one upon the other, and that the platform has finally been swung into the horizontal position, where it is rigidly secured by means of the link 27 and the locking lever 31. The sugar is now in a condition to be transferred to a packing box, if desired, or the stack may be divided into segregated units and transferred into cartons or boxes of varying sizes. If it is desired to transfer the entire stack to a single packing box such as shown at 54 in Fig. 7, it is accomplished by first releasing the locking lever 53 and then swinging the locking bar 50 downwardly and out of the way. The rack bars 41 are then removed and an angle plate, such as shown at 55, is placed against the sugar stack, as shown in Fig. 7. The box 54, guided by said plate, is then placed over the stack and is held against the stack by hand until the table is swung into the vertical position shown in Fig. 8, where it may be tilted away from the receiving platform, thus leaving the sugar in a packed condition within the box, the receiving table 7 being moved under the box when it is tilted away from the receiving platform so that it may be supported thereby while the angle plate 55 is removed and the paper is folded over the upper layer. The box may here be transferred to another operator who nails on the cover or otherwise finishes the packing operation. It may here be stated that sheets of paper such as indicated at 46, see Fig. 4, are only placed between the successive layers of cubes when the entire stack is to be transferred to a single box or carton, and that paper is not employed or placed between the layers when the stack is to be subdivided to be transferred to cartons of smaller sizes as it would interfere with the subdivision of the stack.

After placing the angle plate 55 in position as shown in Fig. 7, and then the box on top of the stack, it will be understood that it is first necessary to release the link 27 and to swing the stop members 26 inwardly against the posts 18, this being necessary to permit the platform to be swung back to the position shown in Fig. 8 when the sugar is transferred from the platform to the box. The function of the stop members 26 is thus two-fold; first, that of maintaining the receiving platform in the position shown in Figs. 1, 4 and 5 when the sugar is being transferred from the trays to the platform, and secondly, that of permitting the table to be moved beyond a vertical position when the stacked sugar is transferred from the platform to the packing box. The description of the packing operation completes the operation of assembling, transferring, stacking and then transferring the sugar to a single box or container.

The machine is, however, adapted for other operations, towit, that of dividing the main stack placed upon the receiving platform and then transferring it in segregated stacks or units to boxes or cartons of smaller or varying sizes. This is accomplished by employing a secondary receiving platform 9. If it is desired to pack the sugar in smaller cartons, it is only necessary to swing the secondary receiving platform about the vertical shaft 34 until it assumes a position cross-wise of the track members 11 or in register with the forward edge of the receiving platform. Assuming that a stack of sugar has been transferred to the main receiving platform 8 and that this has been swung into the horizontal position shown in Fig. 7; furthermore, that the secondary receiving platform has been swung into registry therewith, then it will only be necessary to transfer the sugar from the main receiving platform to the secondary receiving platform. To successfully accomplish this it is necessary that an absolute flush surface and register be maintained between the two platforms. This is accomplished by forming a lug 58 on the free end of the bracket arm 32, which is adapted to enter a recess or fork-shaped lug 59 secured on the lower side and forward edge of the receiving platform. With the two platforms in register, the operation will be as follows: By referring to Fig. 1, it will be seen that the main frame B is supported by means of rollers 6 upon track members 2. The main frame B supporting the several platforms is thus movable with relation to the vertical end frame 3 and the pusher plate 5. To divide the main stack deposited on the receiving platform and to transfer it to the secondary platform, it will therefore only be necessary to move the main frame in the direction of arrow $c$ or against the pusher plate 5. The receiving platform will, during this movement, pass under the horizontal arms 4 and will thus permit the pusher plate to engage the entire stack and move it forwardly upon the receiving platform and over onto the secondary receiving platform, the movement being stopped when the stack engages a guide-plate $9^a$ secured on the secondary receiving platform. With the transferring operation completed, it is only necessary to depress or swing the secondary receiving platform away from the main receiving platform and the bracket arm 32 supporting the same. This is permitted as the secondary receiving platform is supported with relation to the arm 32 by means of hinges $32^a$, see Figs. 1 and 10, the secondary receiving platform being secured in the inclined or depressed position by inserting a wedge such as shown at 60. A block 61 is next placed upon the secondary receiving platform and brought into engagement with the end of the stack of sugar deposited thereon, as shown in Fig. 10. The whole stack may thus be moved end-wise until the angle plate $38^a$ is engaged. The transferring platform thus receives a measured or given quantity of sugar and this may be placed in a carton such as shown at 63, see Fig. 11, by merely depressing the platform or swinging it upon its hinge 37 until it assumes the position shown in Fig. 11. The box 63 is then placed over the angle plate 38 and the sugar contained on the transferring platform. The removable bottom portion 39 is then engaged and the sugar, together with the box, is lifted vertically by the operator into the position shown by dotted lines at 38$^b$. The box is then turned over and the bottom section 39 removed. The box may then be transferred to another operator to complete the packing operation or it may be completed by the same operator. The false bottom 39 is then replaced and the transferring platform returned to normal position by means of the spring 38. The whole stack is again moved end-wise by means of the block 61 until the angle plate 38$^a$ is engaged. The platform is next swung about its hinge 37 to permit a new carton to be placed thereon and the sugar, together with the box enclosing the same, to be removed and the packing operation completed.

This operation is repeated until the entire stack shown at 9$^b$ has been transferred from the secondary receiving platform 9. The wedge 60 is then removed to permit the secondary receiving platform to assume its normal horizontal position, said position being normally mantained by means of springs 32$^b$. The main frame is now moved in the direction of arrow $c$ against the end frame 3 and the pusher plate 5 supported thereby. This will, during the movement of the main frame, force the whole pile contained on the main receiving platform over onto the secondary platform, which, when completely filled, is swung about its hinges 32$^a$ so that the quantity of sugar transferred may be separated with relation to the main stack. The block 61 is again employed and the stack is gradually advanced to permit division of the stack 9$^a$ and transferring of the same in segregated units to cartons provided for the reception of the sugar. This operation is continued until the main stack supported by the main receiving platform 8, has been entirely transferred or removed. Platform 8 is then swung about its pivotal mounting to assume a position shown in Figs. 1 and 4. Drying trays containing cube sugar are again delivered to the table 7 where they are assembled and transferred to the platform 8. Layer after layer is in this manner transferred until the desired quantity has been assembled and stacked upon the receiving platform. This is then swung into the horizontal position after the individual racks 41 have been locked by means of the bar 50. This lock is removed after the horizonal position has been resumed and the table locked by means of the link 27. The racks are then released and removed and the stack of sugar is ready for the packing operation; that is, the entire stack may be transferred to a single packing box or it may be divided to segregated units which may be individually transferred by means of the secondary platform and the transferring platform to cartons of varying sizes.

The main frame B is locked against movement on the track rails 2 when the drying trays are delivered thereto and the sugar carried thereby is being transferred to the receiving platform 8. This is accomplished by means of a foot lever 70, a latch 71 and a spring 72 which normally holds the lever in engagement with the latch. The table is locked by the foot lever and the latch during the first stage of the packing operation; that is, while the sugar is being transferred from the drying trays to the receiving platform. It still remains locked while the receiving platform is tilted to horizontal position and when the stack as a whole is being transferred to boxes such as shown at 54, see Fig. 7. The lever 70 is, however, depressed whenever it is desired to move the main frame rearwardly against the end frame 3; that is, during that stage of the operation when it is desired to divide the main stack and transfer it to the secondary receiving platform. After transference from the main platform to the secondary receiving platform, it is advisable to retract the main frame and lock it by means of the lever 70 while the sugar stack 9$^b$ supported by the secondary receiving platform is being subdivided and transferred to the smaller cartons.

By referring to Fig. 9 it can be seen that it is absolutely essential that the platforms 8 and 9 are maintained in absolute register to insure a perfect transfer of the sugar from one platform to the other. Such register is maintained by means of the lugs 58 and 59 and it is also maintained by means of a latch 80, see Fig. 6, which is adapted to engage a pin 81 secured on the cross bar 19. This latch is normally held in register or in interlocked position with relation to pin 81 by means of a spring 82; that is, when the cross bar 19 is depressed against the tension of the spring 21. It may, however, be released whenever desired, by means of an arm 83 formed on the receiving platform 8 which will release the latch 80 when the platform is returned to vertical position. The platform 8, when assuming its horizontal position and when in register with the secondary receiving platform 9, must assume a horizontal position as the position of the secondary receiving platform is absolutely horizontal. It is therefore necessary to depress the cross bar 19 supporting the main receiving platform and to lock it in this position by means of the latch 80 as the spring 21 would otherwise have a tendency to raise one end of the cross bar and the platform supported thereby, and thus prevent a perfect register between the platforms when sugar is being transferred. The register is, however, maintained when the latch 80 is thrown into locking position as it engages the pin, thereby locking the cross bar in horizontal position. The real function of mounting the cross bar 19, as here shown, see Fig. 3, and providing the spring 21, is to maintain the main receiving platform in a tilted position when sugar is being transferred thereto from the drying trays. That is, platform 8 will assume a right-angular position with relation to the track members 11 and it will also assume a lateral tilt, due to the function of spring 21, thus causing each layer of sugar transferred to rest against the side and bottom portions of the rack bars 41 and positively preventing displacement or accidental collapsing of the assembled layers during transfer and after they have been received by the platform. The lateral inclination of the platform 8 is, however, unnecessary when the horizontal position is assumed and it is in fact objectionable; hence, the reason for providing the latch 80 previously referred to.

The angle bars or track rails 11 are, as previously stated, supported by pivot members 12 at one end and by eccentric members 16 at the opposite end. This adjustable construction is provided for the purpose of permitting adjustment of the track members 11; that is, the track members 11 must assume a right angular position with relation to the platform 8 during the transferring operation and they must also assume a right angular position with relation to the platform 8 when an assembled stack is being transferred to a single packing box, as shown in Fig. 8. This is of considerable importance as it would otherwise be practically impossible to transfer the sugar as a unit from the platform to the packing box.

From the foregoing description it can be seen that a comparatively simple machine has been provided which is adapted to be handled by a single operator, said machine being employed for the purpose of assembling a series of cubes, transferring the same to a receiving platform and in one instance so operated that an assembled stack of cubes may be transferred as a unit to a single packing case and in another instance so operated that the main stack transferred to the receiving platform may be subdivided into segregated lots and transferred to individual cartons or containers of varying sizes. The machine is therefore adaptable for varying conditions and should, under all conditions, practically speaking, eliminate hand packing methods, now so commonly resorted to. The machine should therefore prove a time saver and will at least increase the efficiency or output of any packer at least three-fold. It furthermore prevents breaking or fracturing of the individual cubes and it permits inspection and removal of soiled or broken cubes, thus improving the appearance of the packing and positively eliminates hand contact with the cubes during any of the steps of the packing operation.

Having thus described our invention, what we claim and desire to secure by Letters Patent is—

1. A sugar packing and boxing machine comprising a main frame, a receiving table supported in said frame, a receiving platform mounted in the frame, means for assembling a plurality of cubes of sugar on the receiving table, said means permitting transfer of the cubes when assembled to the receiving platform, said means also permitting stacking of successive assembled layers of cubes upon the platform, and means for dividing the stack of assembled cubes into a successive series of stacks.

2. A sugar packing and boxing machine comprising a main frame, a receiving table supported in said frame, a receiving platform mounted in the frame, means for assembling a plurality of cubes of sugar on the receiving table, said means permitting transfer of the cubes when assembled to the receiving platform, said means also permitting stacking of successive assembled layers of cubes upon the platform, means for dividing the stack of assembled cubes into a successive series of stacks, and means for dividing each series of stacks into another series of stacks.

3. A sugar packing and boxing machine comprising a main frame, a receiving table supported in said frame, a receiving platform mounted in the frame, means for assembling a plurality of cubes of sugar on the receiving table, said means permitting transfer of the cubes when assembled to the receiving platform, said means also permitting stacking of successive assembled layers of cubes upon the platform, means for dividing the stack of assembled cubes into a successive series of stacks, means for dividing each series of stacks into another series of stacks, and means for transferring each of said last named stacks to individual cartons.

4. A sugar packing and boxing machine comprising a main frame, a receiving table supported in said frame, a receiving platform mounted in the frame, means for assembling a plurality of cubes of sugar on the receiving table, said means permitting transfer of the sugar when assembled, to the receiving platform, said means also permitting stacking of successive assembled layers of sugar upon the platform, a secondary receiving platform mounted on the main frame, and means for transferring sections of the sugar stack from the first receiving platform to the second platform.

5. A sugar packing and boxing machine comprising a main frame, a receiving table supported in said frame, a receiving platform mounted in the frame, means for assembling a plurality of cubes of sugar on the receiving table, said means permitting transfer of the sugar when assembled, to the receiving platform, said means also permitting stacking of successive assembled layers of sugar upon the platform, a secondary receiving platform mounted on the main frame, means for transferring sections of the sugar stack from the first receiving platform to the second platform, and means for dividing the sectional stack deposited on the secondary platform into segregated units and transferring the same to individual cartons.

6. A sugar packing and boxing machine comprising a main frame, a receiving table supported in said frame, a receiving platform mounted in the frame, means for assembling a plurality of cubes of sugar on the receiving table, said means permitting transfer of the sugar when assembled, to the receiving platform, said means also permitting stacking of successive assembled layers of sugar upon the platform, a secondary receiving platform mounted on the main frame, means for transferring sections of the sugar stack from the first receiving platform to the second platform, a transferring platform mounted adjacent the secondary receiving platform, means for transferring the sugar from the secondary platform to the transferring platform, and means for transferring directly from the transferring platform to a container.

7. A sugar packing and boxing machine comprising a main frame, a receiving table supported in said frame, a receiving platform mounted in the frame, means for assembling a plurality of cubes of sugar on the receiving table, said means permitting transfer of the sugar when assembled, to the receiving platform, said means also permitting stacking of successive assembled layers of sugar upon the platform, a secondary receiving platform mounted on the main frame, means for transferring sections of the sugar stack from the first receiving platform to the second platform, a transferring platform pivotally attached to the secondary receiving platform, an angle plate secured to said transferring platform, a removable bottom supported by the transferring platform, means for transferring the sugar from the secondary platform to the transferring platform, and means permitting tilting of the transferring platform and direct transference of the sugar to a carton.

8. A sugar packing and boxing machine comprising a main frame, a receiving table supported in said frame, a receiving platform mounted in the frame, means for assembling a plurality of cubes of sugar on the receiving table, said means permitting transfer of the sugar when assembled, to the receiving platform, said means also permitting stacking of successive assembled layers of sugar upon the platform, a secondary receiving platform supported by the main frame, a pivotal mounting for said platform permitting it to assume a position parallel with the main frame or cross-wise thereof, said secondary platform, when swung to a cross-wise position, registering with the main receiving platform, means for maintaining a perfect register between the two platforms, and means for transferring sections of the sugar stack from the first receiving platform to the second platform.

9. A sugar packing and boxing machine comprising a main frame, a receiving table supported in said frame, a receiving platform mounted in the frame, means for assembling a plurality of cubes of sugar on the receiving table, said means permitting transfer of the sugar when assembled, to the receiving platform, said means also permitting stacking of successive assembled layers of sugar upon the platform, a secondary receiving platform supported by the main frame, a pivotal mounting for said platform permitting it to assume a position parallel with the main frame or cross-wise thereof, said secondary platform, when swung to a cross-wise position, registering with the main receiving platform, means for maintaining a perfect register between the two platforms, a pusher plate supported rearwardly of the main receiving platform, and means for permitting end-wise movement of the main frame and the platforms supported thereby so that the pusher plate may engage the main stack and transfer a portion of the sugar from the main receiving platform to the secondary receiving platform.

10. A sugar packing and boxing machine comprising a main frame, a receiving table supported in said frame, a receiving platform mounted in the frame, means for assembling a plurality of cubes of sugar on the receiving table, said means permitting transfer of the sugar when assembled, to the receiving platform, said means also permitting stacking of successive assembled layers of sugar upon the platform, a secondary receiving platform supported by the main frame, a pivotal mounting for said platform permitting it to assume a position parallel with the main frame or cross-wise thereof, said secondary platform, when swung to a cross-wise position, registering with the main receiving platform, means for maintaining a perfect register between the two platforms, a pusher plate supported rearwardly of the main receiving platform, means for permitting end-wise movement of the main frame and the platforms supported thereby so that the pusher plate may engage the main stack and transfer a portion of the sugar from the main receiving platform to the secondary receiving platform, said means comprising a pair of track members, rollers on the main frame supporting it with relation to said track members, and means for locking the main frame against end-wise movement on the track members.

11. A sugar packing and boxing machine comprising a main frame, a receiving table supported thereby, a receiving platform supported on the main frame, a pivotal mounting for the receiving platform permitting said platform to assume a vertical position and a horizontal position, means for locking said platform in a horizontal position, and means permitting end-wise movement of the receiving table with relation to the receiving platform.

12. A sugar packing and boxing machine comprising a main frame, a receiving table supported thereby, a receiving platform supported on the main frame, a pivotal mounting for the receiving platform permitting said platform to assume a vertical position and a horizontal position, means for locking said platform in a horizontal position, means permitting end-wise movement of the receiving table with relation to the receiving platform, and means permitting pivotal movement of the receiving table with relation to the receiving platform.

13. A sugar packing and boxing machine comprising a main frame, a receiving table supported thereby, a receiving platform supported on the main frame, a pivotal mounting for the receiving platform permitting said platform to assume a vertical position and a horizontal position, means for locking said platform in a horizontal position, a pair of track members on the main frame, and rollers on the receiving table supporting the receiving table with relation to the track members and permitting end-wise movement of the receiving table with relation to the receiving platform.

14. A sugar packing and boxing machine comprising a main frame, a receiving table supported thereby, a receiving platform supported on the main frame, a pivotal mounting for the receiving platform permitting said platform to assume a vertical position and a horizontal position, means for locking said platform in a horizontal position, a pair of track members on the main frame, rollers on the receiving table supporting the receiving table with relation to the track members and permitting end-wise movement of the receiving table with relation to the receiving platform, and a pair of shoes secured to the table engageable with the track members to permit pivotal movement of the table with relation to the receiving platform.

15. A sugar packing and boxing machine comprising a main frame, a receiving table supported thereby, a receiving platform supported on the main frame, a pivotal mounting for the receiving platform permitting said platform to assume a vertical position and a horizontal position, means for locking said platform in a horizontal position, a pair of track members on the main frame, rollers on the receiving table supporting the receiving table with relation to the track members and permitting end-wise movement of the receiving table with relation to the receiving platform, a pivotal mounting for one end of the track members, and means supporting the opposite end of the track members, permitting vertical adjustment of the same.

16. A sugar packing and boxing machine comprising a main frame, a receiving table supported thereby, a receiving platform supported on the main frame, a pivotal mounting for the receiving platform permitting said platform to assume a vertical position and a horizontal position, means for locking said platform in a horizontal position, a pair of track members on the main frame, rollers on the receiving table supporting the receiving table with relation to the track members and permitting end-wise movement of the receiving table with relation to the receiving platform, a pair of shoes secured to the table engageable with the track members to permit pivotal movement of the table with relation to the receiving platform, a pivotal mounting for one end of the track members, a pair of eccentrics engaging the opposite end of the track members and supporting the same, and means permitting turning movement of the eccentrics to permit vertical adjustment of the track members.

17. A sugar packing and boxing machine comprising a main frame, a pair of track members, rollers journaled on the main frame, engageable with the track members and permitting end-wise movement of the main frame upon the track members, means for locking the main frame against end-wise movement, a receiving table supported by the main frame, a receiving platform supported by the main frame, means for assembling sugar cubes on the receiving table and for transferring the same to the receiving platform, said means also permitting stacking of successive assembled layers of sugar upon the receiving platform, a secondary receiving platform, and means actuated by end-wise movement of the main frame for dividing and transferring assembled layers of sugar deposited upon the receiving platform to the secondary receiving platform.

18. A sugar packing and boxing machine comprising a main frame, a pair of track members, rollers journaled on the main frame, engageable with the track members and permitting end-wise movement of the main frame upon the track members, means for locking the main frame against end-wise movement, a receiving table supported by the main frame, a receiving platform supported by the main frame, means for assembling sugar cubes on the receiving table and for transferring the same to the receiving platform, said means also permitting stacking of successive assembled layers of sugar upon the receiving platform, a secondary receiving platform, means actuated by end-wise movement of the main frame for dividing and transferring assembled layers of sugar deposited upon the receiving platform to the secondary receiving platform, and means for subdividing the sugar transferred to the secondary receiving platform and transferring the same to cartons.

19. A sugar packing and boxing machine comprising a main frame, a receiving table supported thereby, a receiving platform also supported by the main frame, means permitting a pivotal movement of the receiving platform, means permitting lateral adjustment of the receiving platform, and means permitting end-wise movement of the receiving table with relation to the receiving platform.

20. A sugar packing and boxing machine comprising a main frame, a receiving table supported thereby, a receiving platform also supported by the main frame, means permitting a pivotal movement of the receiving platform, means permitting lateral adjustment of the receiving platform, means permitting end-wise movement of the receiving table with relation to the receiving platform, and means for locking the receiving platform against movement about its pivotal mounting.

21. A sugar packing and boxing machine comprising a main frame, a receiving table supported thereby, a receiving platform also supported by the main frame, means permitting a pivotal movement of the receiving platform, means permitting lateral adjustment of the receiving platform, means permitting end-wise movement of the receiving table with relation to the receiving platform, means for locking the receiving platform against movement about its pivotal mounting, and means for locking the platform against lateral movement.

22. A sugar packing and boxing machine comprising a main frame, a receiving table supported thereby, a receiving platform also supported by the main frame, means permitting a pivotal movement of the receiving platform, means permitting lateral adjustment of the receiving platform, means permitting end-wise movement of the receiving table with relation to the receiving platform, a secondary receiving platform, and means permitting movement of said secondary platform into and out of register with the first receiving platform.

23. A sugar packing and boxing machine comprising a main frame, a receiving table supported thereby, a receiving platform also supported by the main frame, means permitting a pivotal movement of the receiving platform, means permitting lateral adjustment of the receiving platform, means permitting end-wise movement of the receiving table with relation to the receiving platform, a secondary receiving platform supported on the main frame, a pivotal mounting for said platform permitting it to assume a parallel position with relation to the main frame or positioned cross-wise thereof, said secondary platform adapted to form an alignment and register with the first named receiving platform when swung cross-wise of the main frame.

24. A sugar packing and boxing machine comprising a main frame, a receiving table supported thereby, a receiving platform also supported by the main frame, means permitting a pivotal movement of the receiving platform, means permitting lateral adjustment of the receiving platform, means permitting end-wise movement of the receiving table with relation to the receiving platform, a secondary receiving platform supported on the main frame, a pivotal mounting for said platform permitting it to assume a parallel position with relation to the main frame or positioned cross-wise thereof, said secondary platform adapted to form an alignment and register with the first named receiving platform when swung cross-wise of the main frame, and means permitting end-wise movement of the main frame and the receiving table and receiving platforms supported thereby.

25. A sugar packing and boxing machine comprising a main frame, a receiving table supported thereby, a receiving platform also supported by the main frame, means permitting a pivotal movement of the receiving platform, means permitting lateral adjustment of the receiving platform, means permitting end-wise movement of the receiving table with relation to the receiving platform, a secondary receiving platform supported on the main frame, a pivotal mounting for said platform permitting it to assume a parallel position with relation to the main frame or positioned cross-wise thereof, said secondary platform adapted to form an alignment and register with the first named receiving platform when swung cross-wise of the main frame, means permitting end-wise movement of the main frame and the receiving table and receiving platforms supported thereby, and a stationary pusher plate adapted to cooperate with a main receiving platform to transfer sugar deposited thereon to the secondary receiving platform.

26. A sugar packing and boxing machine comprising a main frame, a receiving table supported thereby, a receiving platform also supported by the main frame, means permitting a pivotal movement of the receiving platform, means permitting lateral adjustment of the receiving platform, means permitting end-wise movement of the receiving table with relation to the receiving platform, a secondary receiving platform supported on the main frame, a pivotal mounting for said platform permitting it to assume a parallel position with relation to the main frame or positioned cross-wise thereof, said secondary platform adapted to form an alignment and register with the first named receiving platform when swung cross-wise of the main frame, means permitting end-wise movement of the main frame and the receiving table and receiving platforms supported thereby, a stationary pusher plate adapted to cooperate with a main receiving platform to transfer sugar deposited thereon to the secondary receiving platform, a transferring platform carried by the secondary receiving platform, and means for transferring the sugar received by the secondary receiving platform to the transferring platform and from said latter platform to cartons.

27. A sugar packing and boxing machine comprising a main frame, a support therefor, permitting end-wise movement of the frame, a receiving table supported by the main frame, means permitting end-wise movement of said table, a receiving platform supported by the main frame, means permitting pivotal movement of the platform, means permitting lateral movement of the platform, a secondary receiving platform, and means permitting horizontal swinging movement of the secondary receiving platform with relation to the first named receiving platform.

28. A sugar packing and boxing machine comprising a main frame, a support therefor, permitting end-wise movement of the frame, a receiving table supported by the main frame, means permitting end-wise movement of said table, a receiving platform supported by the main frame, means permitting pivotal movement of the platform, means permitting lateral movement of the platform, a secondary receiving platform, means permitting horizonal swinging movement of the secondary receiving platform with relation to the first named receiving platform, and means permitting rocking movement of the secondary receiving platform with relation to its swinging supporting member.

29. A sugar packing and boxing machine comprising a main frame, a support therefor, permitting end-wise movement of the frame, a receiving table supported by the main frame, means permitting end-wise movement of said table, a receiving platform supported by the main frame, means permitting pivotal movement of the platform, means permitting lateral movement of the platform, a secondary receiving platform, means permitting horizontal swinging movement of the secondary receiving platform with relation to the first named receiving platform, means permitting rocking movement of the secondary receiving platform with relation to its swinging supporting member, a transferring platform carried by the secondary receiving platform, and a hinged connection between the secondary receiving platform and the transferring platform, permitting independent movement thereof.

30. In a sugar packing and boxing machine of the character described a main frame, a receiving table supported by said frame, a receiving platform pivotally mounted in the frame, said platform adapted to assume a substantially vertical and a horizontal position, and means for assembling a plurality of cubes of sugar on the receiving table, said means permitting transfer of the cubes when assembled to the receiving platform when this assumes a vertical position, said means also permitting stacking of successive assembled layers of cube sugar upon the platform to form a main stack thereon, means for securing the assembled stack of sugar on the platform when tilting it from a vertical to a horizontal position, and means for locking the platform when assuming a horizontal position.

In testimony whereof we have hereunto set our hands in the presence of two subscribing witnesses.

JOHN D. SPRECKELS, Jr.
RICHARD LABORDA.

Witnesses:
H. Ward Dawson,
H. E. Ross.